United States Patent [11] 3,576,986

[72] Inventors David R. Brickner;
Billy K. Swift, Phoenix, Ariz.
[21] Appl. No. 790,987
[22] Filed Jan. 14, 1969
[45] Patented May 4, 1971
[73] Assignee Sperry Rand Corporation

[54] ANALOG/DIGITAL DIFFERENTIAL APPARATUS FOR COMPARING RESOLVER OUTPUT DATA WITH A DIGITAL SIGNAL
13 Claims, 3 Drawing Figs.

[52] U.S. Cl. .......... 235/189, 235/186, 235/150.5
[51] Int. Cl. .......... G06g 76/22, G06j 1/00
[50] Field of Search .......... 235/189, 186, 190, 191, 192, 150.26, 150.27, 150.271, 150.272, 197, 150.5, 51, 52, 53; 318/20.250, 20.340, 20.330, 20.260, 20.255

[56] References Cited
UNITED STATES PATENTS
3,119,054 1/1964 Livingston .......... 318/20.260(UX)
3,158,738 11/1964 Pfeiffer .......... 235/186X
3,358,127 12/1967 Dolan .......... 235/150.271
3,464,016 8/1969 Kerwin et al. .......... 328/133X
3,465,135 9/1969 Belsterling et al. .......... 235/186X
3,476,974 11/1969 Turnage, Jr. et al. .......... 235/150.5X

*Primary Examiner*—Malcolm A. Morrison
*Assistant Examiner*—Joseph F. Ruggiero
*Attorney*—S. C. Yeaton

ABSTRACT: Apparatus for comparing an analog input signal with a digital input signal and providing an analog output signal proportional to the difference therebetween, said apparatus comprising an analog/digital differential controller including digital-to-analog converters responsive to the more significant bits of the digital signal and operating in combination with multiplier and subtractor devices for establishing a coarse relationship between the analog and digital input signals and supplying an accurate reference voltage to a fine resolution digital-to-analog converter which is responsive to the less significant bits of the digital signal to produce fine data for summing with the coarse data and thereby form the output signal.

INVENTORS
DAVID R. BRICKNER
BILLY K. SWIFT
BY S. C. Yeaton
ATTORNEY

INVENTORS
DAVID R. BRICKNER
BILLY K. SWIFT
BY S. C. Yeaton
ATTORNEY

ANALOG/DIGITAL DIFFERENTIAL APPARATUS FOR COMPARING RESOLVER OUTPUT DATA WITH A DIGITAL SIGNAL

BACKGROUND OF THE INVENTION

The present invention relates to analog/digital devices and more particularly to apparatus for providing an analog electrical signal proportional to the difference between an input data signal which can be represented by two 90° relative phase-shifted cyclic functions, such as sine and cosine and angular data represented by a binary-coded digital signal. Thus, the invention can be used for comparing resolver output data with a digital signal. It can also be used for comparing digital data with synchro-type signals, such as flux valve output data which has been transmitted through a Scott T or similar transformation device to obtain the 90° phase-shifted signals.

The principle of the invention is based on a trigonometric technique wherein the digital input signal is applied to an analog computing mechanism in which it is processed together with the analog input signal to produce an output signal that is a sine function of the difference between the analog and digital signals in much the same fashion as a completely analog control transformer device. In a conventional closed-loop system, the difference signal can be phase-detected and then applied to gating circuits to control the direction of change in a digital processor, such as an up/down counter, until the digital signal derived from the processor, operates in combination with the analog input signal to reduce the output signal to zero. This is accomplished by converting the digital signal to analog form and then multiplying it with the analog input data to produce product signals which are functions of both the analog input signal and the digital input signal (the feedback signal in a closed-loop system). More specifically, the digital signal, hereinafter referred to as $\psi$, derived from the digital processor is converted to functions of sin $\psi$ and cos $\psi$ and multiplied with the analog input signals sin $\Theta$ and cos $\Theta$ to produce the product signals sin $\Theta$ cos $\psi$ and cos $\Theta$ sin $\psi$ which are then subtractively combined to obtain the difference signal sin($\Theta$—$\psi$). A prior art apparatus operating in this manner utilizes two transformers each having a large plurality of taps affixed thereto which are selectively grounded in response to the digital signal to control the voltage transformation ratio between the primary and secondary windings, the taps being located so as to generate sine and cosine functions, and the multiplication is performed simply by applying the sin $\Theta$ and cos $\Theta$ signals across the primary winding. To achieve a high degree of resolution with this rudimentary system, the digital signal must include a large number of bits so as to be capable of generating the sin $\psi$ and cos $\psi$ functions at closely spaced increments. Obviously, this requires a considerable number of logic circuits for controlling the grounding of the individual taps. For instance, with a digital word having as many as 10 bits slightly more than 1,000 logic combinations would exist and if these were applied to only a 90° sector, the resolution would still only be about one-tenth of a degree. Moreover, comparatively large transformers would be needed in order to accommodate the large number of taps and fabrication difficulties would be presented.

The foregoing problems can be circumvented by using a coarse-fine system wherein the transformers have a substantially smaller number of taps and are controlled by only the more significant bits of the digital signal in order to make $\psi$ approach $\Theta$ to within a predetermined amount, for example, 15° or less in the case of an input signal representing angle data. Thereafter, the coarse signal information derived from the transformer can be combined with fine resolution data supplied from a digital-to-analog converter which is responsive to the less significant bits of the digital signal. In this way, the complexity of the transformers is reduced and very high resolution can be attained with a significantly smaller number of logic circuits. Another problem arises, however, in the coarse-fine system. This pertains to the reference voltage which must be supplied to the fine resolution converter. To consider this problem in more detail, assume a linearized system in which the transformers have a plurality of taps positioned so as to permit control of the voltage transformation ratio from zero to 100 percent in 10 percent increments. Thus, if a voltage V applied across the primary winding is to be multiplied so as to produce in the secondary winding a voltage equal to 0.24V, the closest tap will be able to adjust the transformation ratio to provide 0.2V. The remaining 0.04V will be produced by the fine resolution converter which has a reference voltage of 0.1V applied to it, corresponding to the voltage between adjacent taps of the transformer. The fine resolution converter will then respond to the less significant bits of the digital signal so as to furnish an output voltage equal to four-tenths of the reference voltage, or 0.04V, which when added to the 0.2V coarse data voltage will provide the desired result of 0.24V. Now assume that the voltage applied to the primary winding increases 10 percent to 1.1V and further assume that this change is not caused by a change in the input date ($\Theta$) but is instead caused by a variation in the excitation voltage supplied to the input synchro, resolver of flux valve. Under these circumstances, the digital signal should be the same as it was when voltage V was applied to the primary winding of the transformer in order to be an accurate representation of the input signal. Hence, the voltage 1.1V when multiplied as before by the same more significant bits will have to produce a voltage 10 percent higher in the secondary, namely, 0.264V. The closest transformer tap will now produce a coarse data signal of 0.22V but the fine resolution converter responding to the same less significant bits will again provide a voltage equal to four-tenths of the 0.1V reference voltage or 0.04V. Thus, the sum of the coarse and fine voltages will be 0.260V which is 0.004V less than the required amount. As a result, the digital processor will change to a new value and thereby introduce error into the conversion. In situations where nondata voltage changes are caused by variations in the excitation voltage supplied to the input data sensor, the foregoing problem can be eliminated simply by having the reference voltage of the fine resolution converter track the excitation voltage. In the previous example, for instance, if the reference voltage had also increased by 10 percent, the proper digital conversion would have been achieved. In many cases, data changes cannot be discriminated from other factors which cause the input signal to vary. For instance, in a compass system which utilizes a flux valve for determining direction relative to the earth's magnetic field, the input signal may vary because of changes in the orientation of the valve with respect to the field (a true data input) or because of changes in the excitation voltage applied to the valve or finally because of changes in the intensity of the earth's magnetic field. The latter cannot be distinguished from true data variations. In a system of this sort, therefore, some other means must be provided for establishing an adequate reference voltage for the fine resolution converter.

SUMMARY OF THE INVENTION

The present invention utilizes the trigonometric technique of the prior art and is based essentially on the principles of a coarse-fine system. It also includes, however, unique means for overcoming those limitations attendant to the provision of fine resolution data. In a preferred embodiment of the invention, the input signal represented by V sin $\Theta$ and V cos $\Theta$ is applied to first and second pairs of transformers each having a plurality of taps affixed to its primary winding and operating in conjunction with tap selection logic circuits responsive to the more significant bits of the digital signal stored in a digital processor for selectively grounding the individual taps which are positioned so as to generate voltage transformation ratios representative of sine and cosine functions. The first transformer pair generates the product signals V cos $\Theta$ sin $\psi_a$ and V sin $\Theta$ cos $\psi_a$ which in turn are subtractively combined to provide a signal $S_1$=V sin ($\psi_a$—$\Theta$). The second transformer pair generates the product signals V sin $\Theta$ cos $\psi_b$ and V cos $\Theta$ sin $\psi_b$ which are combined to provide a signal $S_2$=V sin ($\psi_b$−Θ). Signals $S_1$ and $S_2$ are then subtractively combined to produce a signal $E_R = V \sin(\psi_b - \psi_a)$ which is approximately equal to V ($\psi_b$−$\psi_a$) for angles on the order of 15° or less, that is, in the linear region of the sine function.

The signal $E_R$ is applied to the reference terminal of a fine resolution digital-to-analog converter which is responsive to the less significant bits of the converted digital signal. Inasmuch as signal $E_R$ is independent of the input data variable Θ but dependent on V, it can be made to track all nondata variations and thereby supply the fine resolution converter with a reference voltage that is compatible with the coarse data signal $S_1$. Thereafter, the fractional part of the reference voltage appearing at the output terminal of the fine resolution digital-to-analog converter is added to signal $S_1$ to produce an output signal which is a sine function of the difference between Θ and ψ. The output signal in turn is applied through a phase detector to a digital processor to control the direction of change until the digital signal ψ stored therein corresponds to the analog input signal Θ.

DESCRIPTION OF THE PREFERRED EMBODIMENT

Figure 1:
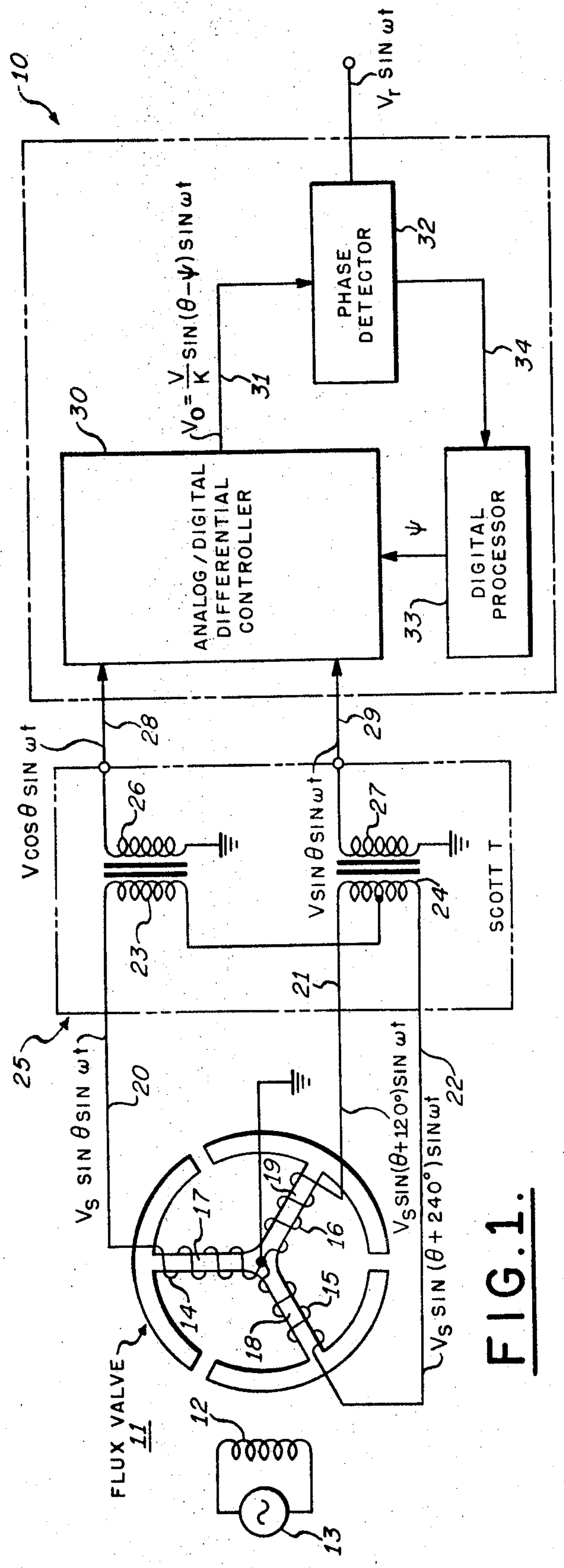
FIG. 1 is a block diagram illustrating the analog/digital differential apparatus of the invention in combination with a flux valve compass system.

Referring to FIG. 1, the analog/digital differential apparatus of the present invention is incorporated in an analog-to-digital converter 10 and will be described with reference to a compass system which derives its directivity from the horizontal component of the earth's magnetic field by means of a flux valve 11 having a primary coil 12 energized from an alternating-current electrical energy source 13. The excitation applied to the primary coil induces voltages in the secondary coils 14, 15, and 16, wound on equiangularly spaced flux conductive legs 17, 18 and 19 in accordance with the azimuthal position of the valve in the earth's field. The secondary voltage have a common carrier frequency which is determined by the frequency of the excitation source and are amplitude-modulated as a consequence of the relative spatial distribution of the coils such that their waveform envelopes are shifted by 120° relative to one another. Thus, they can be represented mathematically as [$V_s$ sin Θ] sin ωt, [$V_s$ sin (Θ+120°)] sin ωt and [$V_s$ sin (Θ+240°)] sin ωt where ω is the carrier frequency and Θ represents the angle between the earth's field and the axis of the flux valve. Leads 20, 21 and 22 connect the flux valve secondary coils to the primary windings 23 and 24 of Scott T transformer 25 which converts the three 120° relative phase-displaced voltages to two 90° relative phase-displaced voltages designated respectively as V cos Θ sin ωt and V sin Θ sin ωt. These analog sine and cosine functions are coupled from the secondary windings of the Scott T through leads 28 and 29 to analog-to-digital converter 10 which operates, in a closed loop servo embodiment, to convert the analog electrical angle information signals to an equivalent digital signal ψ. This is accomplished by means of analog/digital differential controller 30 combining the analog sine and cosine functions of Θ and the digital signal ψ in a manner to produce at its output terminal 31 a signal $V_o$ which is a function of the sine of the difference between Θ and ψ, that is, $$V_0 = \frac{V}{K} \sin(\theta - \psi)$$

The polarity of output signal $V_o$ will then depend only on whether Θ is greater or less than ψ. This is determined by demodulator 32 wherein signal $V_o$ is phase-detected by comparison with a reference AC voltage $V_r$ sin ωt. Logic circuits in counter (digital processor) 33 are then actuated to gate pulses from a master clock into the counter stages in accordance with the polarity of the signal applied thereto from the demodulator on lead 34. This action controls the direction of the count so as to make ψ correspond to Θ whereupon the demodulator output will reduce to zero and the count will remain constant. The digital signal ψ can then be processed in a digital computer or displayed to a pilot to control the heading of a craft in which the compass system is installed. Initially, for purposes of calibration, the counter is set at zero or some other reference value when the angle Θ is equal to zero.

Figure 2:
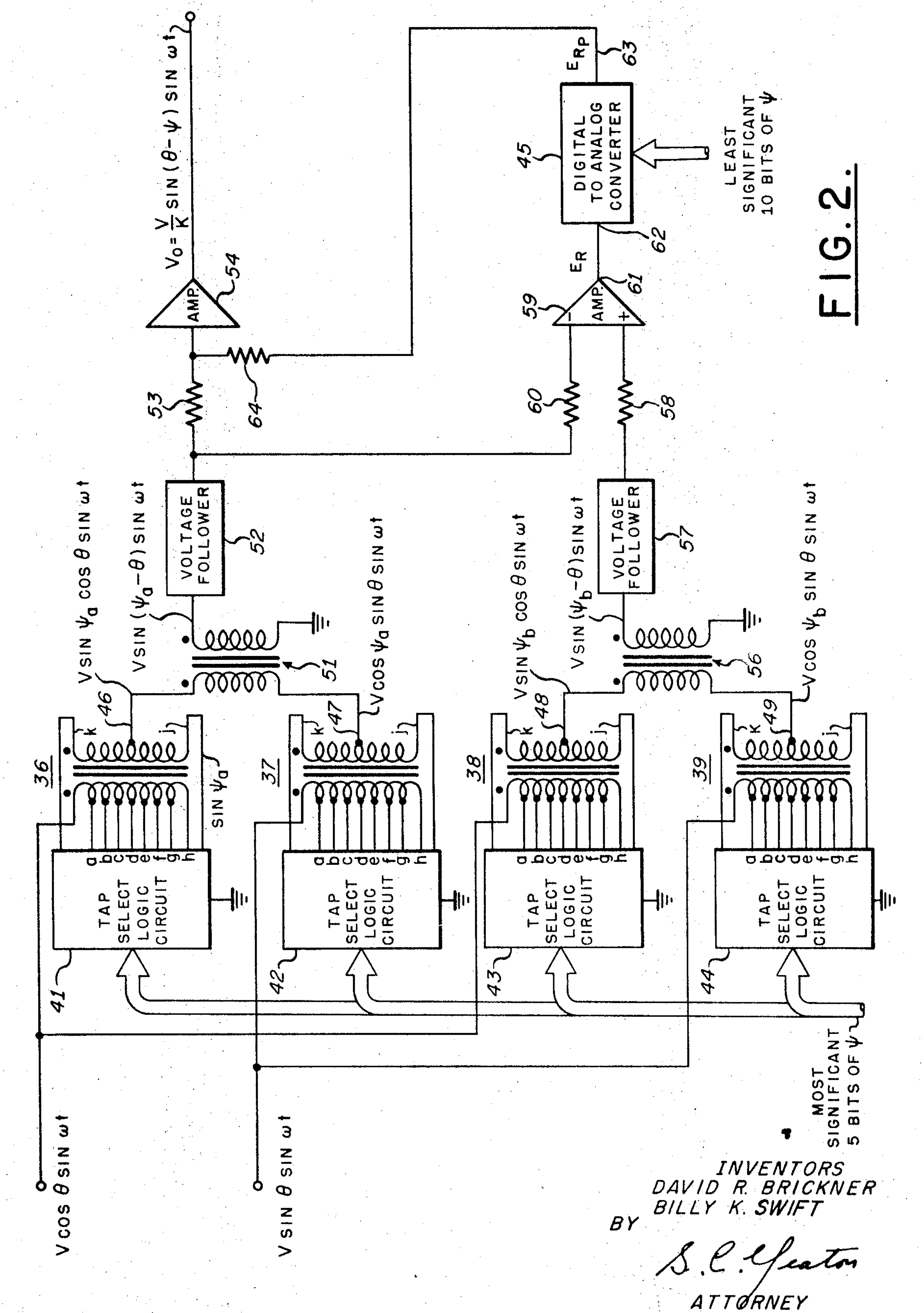
FIG. 2 is a schematic diagram of the analog/digital differential apparatus constructed in accordance with the principles of the invention.

For a more detailed description of the operation of analog/digital differential controller 30, reference is now made to FIG. 2 wherein, as indicated, the electrical angle input signal V cos Θ sin ωt is connected to the primary windings of transformers 36 and 38 and input signal V sin Θ sin ωt is connected to the primary windings of transformers 37 and 39. The primary winding of each transformer has a plurality of taps which operate in conjunction with the associated tap selection logic circuits 41, 42, 43 and 44 to selectively ground individual taps and thereby control the voltage transformation ratio between the primary and secondary windings of the respective transformers, the taps being positioned on the primary windings such that the transformation ratios correspond to sine and cosine functions. The tap selection logic circuits are actuated by the more significant data bits of the digital signal ψ obtained from the digital processor. These data bits correspond to the discrete voltage levels present at the output terminals of the individual digital processor output register stages and are represented respectively by zero and one. For the purpose of illustration, the five most significant bits A, B, C, D and E are applied to the tap selection circuits although obviously more or less bits could be used as desired. Bits A and B operate to select the quadrant and bits B, C, D and E control the voltage transformation ratio. As will be explained subsequently in greater detail, each transformer represents only a 90° sector which is made to operate in four quadrants by grounding one end or the other of the secondary windings. The transformer and tap selection circuits thus perform the dual function of first converting the digital signal to corresponding analog sine and cosine functions and then multiplying these functions with the analog functions of the electrical angle information which is to be converted to digital form.

Before proceeding to a more detailed explanation of the operation of the transformer and tap selection circuits, first consider basically what the invention is intended to do. It will be readily understood that if only two transformers are used to generate the products V sin Θ cos ψ sin ωt and V cos Θ sin ψ sin ωt, which are subtractively combined to provide a signal V sin Θ cos ψ sin ωt−V cos Θ sin ψ sin ωt=V sin (Θ−ψ) sin ωt, then the data in the digital processor will continue to change until ψ is equal to Θ. How closely ψ approaches Θ will depend upon the number of taps employed. For example, to achieve a resolution of 1°, 90 taps would be required on the primary winding of each transformer and in order to be compatible with the binary data derived from the counter 128 taps would have to be used. To attain significantly improved resolution, a considerably larger number of taps would be required. One alternative to this approach would be to utilize a transformer having considerably fewer taps which are controlled by the more significant bits of the digital signal to provide coarse resolution and then combine the signal obtained therefrom with that derived from a fine resolution digital-to-analog converter 45 which is responsive to the less significant bits to provide fine resolution within any of the coarse increments. As previously mentioned, high accuracy can be achieved with this setup only if the reference voltage supplied to the fine resolution network is able to track all variations in the input signal except those related to angle changes. Where signal amplitude variations are caused only by changes in the angles or the excitation voltage, it is possible to discriminate one from the other simply by monitoring the excitation voltage. Then, the reference voltage can be controlled to track the excitation voltage. On the other hand, if other factors also affect the input signal amplitude, this technique is not suitable. The invention overcomes this limitation by utilizing two additional transformers whose product signals are combined with the product signals from the first transformer pair to produce a voltage which tracks all variations in the input signal voltage exclusive of those caused by changes in the angle Θ. This is accomplished by utilizing the digital signal $\psi$ to generate in each pair of transformers slightly different sine and cosine functions which will be referred to hereinafter as functions of $\psi_a$ and $\psi_b$.

Now consider the operation of transformers 36, 37, 38 and 39 and their associated tap selection circuits. Bits C, D and E of the digital signal have the typical binary sequence

| | | |
|---|---|---|
| **0** | **0** | **0** |
| **0** | **0** | **1** |
| **0** | **1** | **0** |
| **0** | **1** | **1** |
| **1** | **0** | **0** |
| **1** | **0** | **1** |
| **1** | **1** | **0** |
| **1** | **1** | **1** |

thereby providing a total of eight different logic combinations. Each of these logic combinations operates either to connect a prescribed tap to ground or alternatively not to ground any of the taps on the primary winding of each transformer. For instance, in the case of transformer 36, which generates a sine function of the digital signal, when tap *a* is grounded, the voltage transformation ratio from the primary to the secondary winding is 1-to-1. Hence, V cos Θ sin $\omega t$ is multiplied by unity or the sine of 90°. On the other hand, when none of the primary taps are grounded, the voltage induced in the secondary is zero so V cos Θ sin $\omega t$ is multiplied by zero of the sine of 0°. When other tap positions are connected to ground V cos Θ sin $\omega t$ is multiplied by the sine of discrete signals in increments of 11.25° as indicated in table 1, the total of eight increments providing complete coverage of a 90° sector. As further indicated in table 1, the input signal V sin Θ sin $\omega t$ applied to transformer 37 is likewise multiplied by the cosine of angle $\omega$ in 11.25° increments as the various taps on transformer 37 are grounded.

TABLE 1

| Sine transformer (36) | | Cosine transformer (37) | | |
|---|---|---|---|---|
| Tap grounded | Angle, degrees | Tap grounded | Angle, degrees | Voltage ratio, $V_{SEC}/V_{PRI}$ |
| a | 90 | a | 0 | 1.00000 |
| b | 78.75 | b | 11.25 | 0.98079 |
| c | 67.5 | c | 22.5 | 0.92388 |
| d | 56.25 | d | 33.75 | 0.83147 |
| e | 45 | e | 45 | 0.70711 |
| f | 33.75 | f | 56.25 | 0.55557 |
| g | 22.5 | g | 67.5 | 0.38268 |
| h | 11.25 | h | 78.75 | 0.19509 |
| None | 0 | None | 90 | 0.00000 |

Using two additional transformers, namely, transformers 39 and 39, provides for the derivation of an appropriate reference voltage for the fine resolution digital-to-analog converter 45 in the following manner. Transformers 38 and 39 have their taps arranged the same as those on transformers 36 and 37 but the associated tap selection logic circuits 43 and 44 operate to adjust the voltage transformation ratios to values which are displaced from those of transformers 36 and 37 by 11.25°. More specifically, referring to table 1 in conjunction with table 2, which indicates the taps that are grounded on transformers 36, 37, 38 and 39 for the various combinations of the five most significant data bits, when data bits B, C, D and E are, for example 0 0 1 0, respectively, tap *g* is grounded on transformer 36 and tap *c* is grounded on transformer 37 so that V cos Θ sin $\omega t$ is multiplied by sin $\psi_a$ = sin 22.5° and V sin Θ sin $\omega t$ is multiplied by cos $\psi_a$ = cos 22.5°. At the same time, tap *f* is grounded on transformer 38 and tap *d* is grounded on transformer 39 causing V cos Θ sin $\omega t$ to be multiplied by sin $\psi_b$ = sin 33.75° and V sin Θ sin $\omega t$ to be multiplied by cos $\psi_b$ = cos 33.75°. Stabilization of data bits B, C, D and E at 0 0 1 0 is then an indication that Θ lies in the range of 22.5° to 33.75°. Thereafter, the less significant bits of the digital signal control digital-to-analog converter 45 to select a portion of the reference voltage which when added to the coarse data will provide a highly accurate digital representation of the analog function of Θ. In the embodiment shown in FIG. 2, 10 bits are used to control digital-to-analog converter 45 thereby providing a resolution of $1/2^{10}$ or 1/1,024th part of 11.25° or approximately 0.01°.

As previously stated, bits B, C, D and E actuate the tap selection logic circuits which relate to the taps of the primary windings. The logic circuits are of conventional construction and typically comprise appropriate combinations of AND and OR circuits. For example, when data bits B, C, D, E are 0 0 1 0, written logically as $\bar{B}\ \bar{C}\ D\ \bar{E}$, tap *g* of transformer 36 is grounded. In the logical symbols a letter without a bar over it indicates the presence of a data bit as represented by a discrete voltage level and a letter with a bar signifies the inverse or absence of the data bit. Likewise, when data bits B, C, D, E are 1 1 1 0 written logically as $B\ C\ D\ \bar{E}$, tap *g* is again connected to ground. Thus, with regard to transformer 36, which generates sin $\psi_a$, the logic for grounding tap *g* is $D\ \bar{E}\ (\bar{B}\ \bar{C} + B\ C)$ which is read as D and not E and either not B and not C or B and C and the "+" sign is construed as the customary logical OR notation.

TABLE 2

| Counter data bits | | | | | Tap connected to ground on— | | | |
|---|---|---|---|---|---|---|---|---|
| A | B | C | D | E | Transformer 41 | Transformer 42 | Transformer 43 | Transformer 44 |
| 0 | 0 | 0 | 0 | 0 | No tap grounded | a | h | b. |
| 0 | 0 | 0 | 0 | 1 | h | b | g | c. |
| 0 | 0 | 0 | 1 | 0 | g | c | f | d. |
| 0 | 0 | 0 | 1 | 1 | f | d | e | e. |
| 0 | 0 | 1 | 0 | 0 | e | e | d | f. |
| 0 | 0 | 1 | 0 | 1 | d | f | c | g. |
| 0 | 0 | 1 | 1 | 0 | c | g | b | h. |
| 0 | 0 | 1 | 1 | 1 | b | h | a | None. |
| 0 | 1 | 0 | 0 | 0 | a | None | b | h. |
| 0 | 1 | 0 | 0 | 1 | b | h | c | g. |
| 0 | 1 | 0 | 1 | 0 | c | g | d | f. |
| 0 | 1 | 0 | 1 | 1 | d | f | e | e. |
| 0 | 1 | 1 | 0 | 0 | e | e | f | d. |
| 0 | 1 | 1 | 0 | 1 | f | d | g | c. |
| 0 | 1 | 1 | 1 | 0 | g | c | h | b. |
| 0 | 1 | 1 | 1 | 1 | h | b | None | a. |
| 1 | 0 | 0 | 0 | 0 | None | a | h | b. |
| 1 | 0 | 0 | 0 | 1 | h | b | g | c. |
| 1 | 0 | 0 | 1 | 0 | g | c | f | d. |
| 1 | 0 | 0 | 1 | 1 | f | d | e | e. |
| 1 | 0 | 1 | 0 | 0 | e | e | d | f. |
| 1 | 0 | 1 | 0 | 1 | d | f | c | g. |
| 1 | 0 | 1 | 1 | 0 | c | g | b | h. |
| 1 | 0 | 1 | 1 | 1 | b | h | a | None. |
| 1 | 1 | 0 | 0 | 0 | a | None | b | h. |
| 1 | 1 | 0 | 0 | 1 | b | h | c | g. |
| 1 | 1 | 0 | 1 | 0 | c | g | d | f. |
| 1 | 1 | 0 | 1 | 1 | d | f | e | e. |
| 1 | 1 | 1 | 0 | 0 | e | e | f | d. |
| 1 | 1 | 1 | 0 | 1 | f | d | g | c. |
| 1 | 1 | 1 | 1 | 0 | g | c | h | b. |
| 1 | 1 | 1 | 1 | 1 | h | b | None | a. |

Quadrant selection is controlled by the two most significant bits A and B which, as indicated in table 2 have the binary sequence

| | |
|---|---|
| **0** | **0** |
| **0** | **1** |
| **1** | **0** |
| **1** | **1** |

Referring to table 3, it is seen that the sine function, which is positive in the first and second quadrants and negative in the third and fourth quadrants, is thus positive for A B equals 0 0 and 0 1 and negative for A B equals 1 0 and 1 1. Hence, with the polarities as indicated by the dots on transformers 36, 37, 38 and 39, tap select circuits 41 and 43 operate to ground the *j* taps on transformers 36 and 38 when A is 0, that is, for $\bar{A}$, to provide a signal of positive polarity at the center terminal of the secondary winding. Likewise, the *k* taps of transformers 36 and 38 are grounded when A is 1 to provide a negative polarity signal at the center terminals. On the other hand, the cosine function, which is positive in the first and fourth quadrants and negative in the second and third quadrants is positive for A B equals 0 0 or 1 1 and negative for A B equals 0 1 or 1 0. Hence, tap select circuits 42 and 44 operate to ground the *j* taps of transformers 37 and 39 when A and B are both 0 or both 1, that is, for A B or $\overline{A\,B}$ which may also be represented logically as $\overline{A \oplus B}$ where "$\oplus$" is the exclusive OR notation. Finally, the *k* taps of transformers 37 and 39 are grounded when either A or B, but not both, is 1, that is, for A $\overline{B}$ or $\overline{A}$ B which is equal logically to A $\oplus$ B. It should be understood that the two most significant bits determine the polarity of only the sine and cosine functions of $\psi_a$ and $\psi_b$. The polarity of the input signals V cos Θ sin $\omega t$ and V sin Θ sin $\omega t$ are, of course, determined by the input sensor.

TABLE 3

| Quadrant | 1 | 2 | 3 | 4 |
|---|---|---|---|---|
| Two most significant bits A and B | 00 | 01 | 10 | 11 |
| Sin $\psi$ | + | + | − | − |
| Cos $\psi$ | + | − | − | + |

Center terminals 46 and 47 on the secondary windings of the transformers 36 and 37 are connected to the primary winding of transformer 51 wherein signals V sin $\psi_a$ cos Θ sin $\omega t$ and V cos $\psi_a$ sinΘ sin $\omega t$ are subtractively combined to produce a signal V sin ($\psi_a$−Θ) sin $\omega t$ in the secondary winding which is coupled through voltage-follower 52 and resistor 53 to summing amplifier 54. In the same manner, center terminals 48 and 49 on the secondary windings of transformers 38 and 39 are connected to the primary winding of transformer 56 wherein signals V sin $\psi_b$ cos Θ sin $\omega t$ and V cos $\psi_b$ sin Θ sin $\omega t$ are subtractively combined to produce a signal V sin ($\psi_b$−Θ) sin $\omega t$ in the secondary winding which is connected through voltage-follower 57 and resistor 58 to summing amplifier 59. Signal V sin ($\psi_a$−Θ) sin $\omega t$ appearing at the output terminal of the voltage-follower 52 is also connected through resistor 60 into summing amplifier 59 wherein it is subtractively combined with signal V sin ($\psi_b$−Θ) sin $\omega$ $t$ to produce a signal $E_R$ on summing amplifier output lead 61. $E_R$ does not depend on Θ but is a function solely of V, $\psi_a$ and $\psi_b$, assuming negligible drift in the summing amplifier. This relation is true irrespective of the relative values of Θ and $\psi$ as can be shown by a rigorous mathematical proof but a simplified proof can be given here for the case where $\psi$ has become sufficiently close to Θ so that Θ is bracketed by $\psi_a$ and $\psi_b$, that is, $\psi_b$ is an angle greater than Θ and $\psi_a$ is an angle less than Θ. For this condition, since $\psi_b$−$\psi_a$=11.25°, region in which the sine function is approximately linear, V sin ($\psi_a$ − Θ) and V sin ($\psi_b$ − Θ) can be approximated by V($\psi_a$ − Θ) and V($\psi_b$ − Θ) whereupon $E_R$ ≅ V($\psi_b$ − Θ) − V($\psi_a$ − Θ) = V($\psi_b$ − $\psi_a$). Inasmuch as $\psi_b$ − $\psi_a$ is a constant $E_R$ then tracks any changes in the input signal which are not related to changes in the angle Θ. The carrier term sin $\omega t$ has been omitted from these mathematical relationships since it does not affect their validity and this procedure will be followed hereinafter. In actuality, however, the carrier term is present until the signals are applied to phase detector 32.

Digital-to-analog converter 45 is a resistive linear ladder network of the type disclosed and explained on pages 5—29 to 5—40 in "Notes on Analog-Digital Conversion Techniques," edited by A. K. Susskind and published by the Technology Press, Massachusetts Institute of Technology, 1957. It is responsive to the less significant bits of digital signal $\psi$ to produce at its output terminal 63 a signal $E_{R_P}$ which is a fraction of the reference voltage $E_R$ connected from summing amplifier 59 to reference input terminal 62. $E_{R_P}$ is in turn connected through resistor 64 to combine additively in summing amplifier 54 with signal V sin ($\psi_a$−Θ), provided at the output of voltage-follower 52, to produce an output signal $$V_0=\frac{V}{K}\sin(\theta-\psi)$$

as explained hereinbefore where K is a proportionality factor that accounts for the gain of the various amplifier stages.

The signal V sin ($\psi_a$−Θ)+$E_{R_P}$ which is applied to the input terminal of summing amplifier 54 can be written in complete equation form as $$V\sin(\psi_a-\Theta)+\gamma V[\sin(\psi_b-\Theta)-\sin(\psi_a-\Theta)=V_o \quad (1)$$

where $\gamma$ represents the fractional part of $E_R$ which is transmitted through digital-to-analog converter 45. Appropriate manipulation of this equation in the following manner will indicate the value that $\gamma$ must assume in order to achieve an output signal $V_o$ equal to zero. V sin ($\psi_a$−Θ) may be expanded as $$V[\sin\psi_a\cos\Theta-\cos\psi_a\sin\Theta].$$

Similarly, $\gamma$V sin ($\psi_b$−Θ) and −$\gamma$V sin ($\psi_a$−Θ) can be expanded as $$\gamma V[\sin\psi_b\cos\Theta-\cos\psi_b\sin\Theta]$$

and $-\gamma V[\sin\psi_a\cos\Theta-\cos\psi_a\sin\Theta]$, respectively. Rearranging these expanded equations and setting $V_o$ equal to zero, the desired result which obtains when $\psi$=Θ, yields $$\sin\psi\cos\psi_a-\cos\psi\sin\psi_a=\gamma\cos\psi\sin\psi_b-\gamma\cos\psi\sin\psi_a-\gamma\sin\psi\cos\psi_b+\gamma\sin\psi\cos\psi_a$$

where $\psi$ has been substituted for Θ. The terms on the right side of the equation now reduce to $$-\gamma\sin(\psi-\psi_b)+\gamma\sin(\psi-\psi_a)$$

which is equal to $$\gamma[\sin(\psi_b-\psi)+\sin(\psi-\psi_a)]$$

Hence $$\gamma=\frac{\sin(\psi-\psi_a)}{\sin(\psi_b-\psi)+\sin\psi-\psi_a}$$

or $$\gamma\simeq\frac{(\psi-\psi_a)}{(\psi_b-\psi_a)}$$

Thus, $\gamma$ is equal to that fractional part of the difference between $\psi_b$ and $\psi_a$ which corresponds to the difference between $\psi$ and $\psi_a$. A rigorous mathematical treatment of equation (1) wherein the above-derived exact value is substituted for $\gamma$ will show that the output signal is a function of the sine of the difference between Θ and $\psi$ irrespective of their relative magnitudes. A more simplified proof can be provided, however, when Θ lies between $\psi_a$ and $\psi_b$, by using the small angle approximation for sine functions. In that instance, the input signal to summing amplifier 54 is $$(\psi_a-\theta)+(\psi_b-\psi_a)\cdot\frac{(\psi-\psi_a)}{(\psi_b-\psi_a)}$$

or $\psi$−Θ which is made equal to Θ−$\psi$ merely by providing phase inversion in summing amplifier 54.

If the approximate value of $\gamma$, namely, $$\frac{\psi-\psi_a}{\psi_b-\psi_a}$$

is substituted in equation (1), rearranged and simplified, then $$v_0=\sin\theta\left[\cos\psi_a+\frac{\psi-\psi_a}{\psi_b-\psi_a}(\cos\psi_b-\cos\psi_a)\right]-\cos\theta\left[\sin\psi_a+\frac{\psi-\psi_a}{\psi_b-\psi_a}(\sin\psi_b-\sin\psi_a)\right]$$

which can be written as $$V_o(\psi_b-\psi)=\sin\Theta[(\psi_b a l\psi)\cos\psi_a+(\psi-\psi_a)\cos\psi_b]-\cos\Theta[(\psi_b\psi)\sin\psi_a+(\psi-\psi_a)\sin\psi_b]$$

which is equal to $$(\psi_b-\psi)(\sin\Theta\cos\psi_a-\cos\Theta\sin\psi_a)+(\psi-\psi_a)(\sin\Theta\cos\psi_b-\cos\Theta\sin\psi_b)$$

or $$(\psi_b-\psi)\sin(\Theta-\psi_a)+(\psi-\psi_a)\sin(\Theta-\psi_b)=(\psi_b-\psi_a)=V_o$$

which for small angle approximations reduces to $$(\psi_b-\psi)(\Theta-\psi_a)+(\psi-\psi_a)(\Theta-\psi_b)=(\psi_b-\psi_a)=V_o \quad (2)$$

Equation (2) is useful for illustrating that the digital signal $\psi$ is servoed, irrespective of its initial value relative to Θ, until it approaches Θ to a limit determined by the resolution of the system. Since $\psi$ is less than $\psi_b$ and greater than $\psi_a$, both ($\psi_b$−$\psi$) and ($\psi$−$\psi_a$) are positive. Thus, the polarity of equation (2) is determined by the (Θ−$\psi_a$) and (Θ−$\psi_b$) terms.

Figure 3:
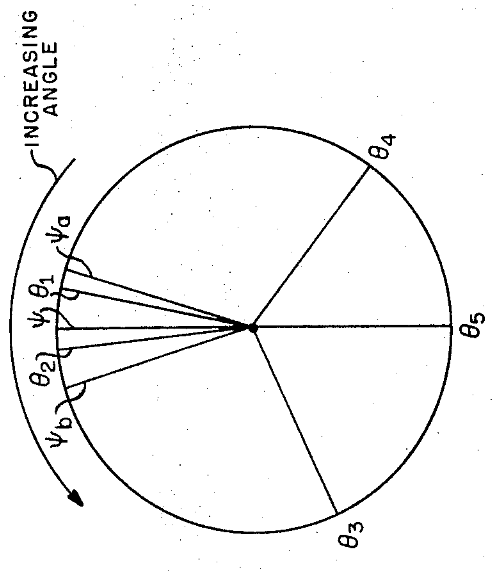
FIG. 3 is an angle diagram which is useful for explaining the operation of the invention.

Refer now to FIG. 3 and consider the case where $\psi_a$ and $\psi_b$ are at the indicated angles when Θ=$\Theta_1$. Then ($\Theta_1$−$\psi_a$) is positive and ($\Theta_1$−$\psi_b$) is negative. Further, since ($\psi$−$\psi_a$) is greater than $(\Theta_1-\psi_a)$ and $(\Theta_1-\psi_b)$ is greater than $(\psi_b-\psi)$, the second term on the left side of equation (2) will determine the polarity of the equation. Inasmuch as $(\Theta_1-\psi_b)$ is negative, $V_o$ will be negative so the count will decrease to make $\psi=\Theta_1$. For the case where $\Theta=\Theta_2$, $(\psi-\psi_a)$ is less than $(\Theta_2-\psi_a)$ and $(\Theta_2-\psi_b)$ is less than $(\psi_b-\psi)$. Again, all the terms are positive except $(\Theta_2-\psi_b)$ but now the polarity is determined by the first term on the left side of the equation so $V_o$ will be positive and thus cause the count to increase until $\psi=\Theta_2$.

Although the assumption regarding equation (2) is not accurate when $(\Theta-\psi_a)$ and $(\Theta-\psi_b)$ are not small angles, it can nevertheless be used to demonstrate the operability of the servo action for situations where $\Theta$ is located outside the region bounded by $\psi_a$ and $\psi_b$. Hence, for $\Theta=\Theta_3$, both $(\Theta_3-\psi_a)$ and $(\Theta_3-\psi_b)$ are positive so $V_o$ will be positive and cause $\psi$ to increase to equal $\Theta_3$. In the instance where $\Theta=\Theta_5$, an angle displaced from $\psi$ by 180°, $$V_o=\frac{V}{K}\sin(\theta-\psi)$$

will be equal to zero but this is the typical unstable condition that exists in all servomechanisms. A disturbance that slightly increases or decreases the angle $(\psi-\Theta)$ will cause appropriate serving of $\psi$ so that it becomes equal to zero. Finally, when $\Theta$ is displaced from $\psi$ by more than 180°, for example, where $\Theta=\Theta_4$ $(\Theta_4-_a)$ and $(\Theta_4-\psi_b)$ will both be negative causing $V_o$ to be negative so that the count will decrease to bring $\psi$ into coincidence with $\Theta$ through the smallest angular change.

While throughout the foregoing description, the analog/digital differential apparatus has, at least in part, been described in a closed-loop servo embodiment, it will be understood that the teachings of the invention may be useful in any system wherein it is desired to obtain an analog output proportional to the difference between two angular input measures, one in analog format and the other in digital format; in short, the invention has general utility as a solid-state analog/digital control transformer. For example, it is useful in a gyromagnetic compass system wherein long term compass information, as supplied from a flux valve, is in analog form and wherein short term gyroscopic information, as supplied from, say, a stable platform, is in binary digital form and it is desired to produce an analog output proportional to the angular difference between the compass information and the gyroscopic information. Also, the invention may be employed in autopilot and/or other flight instrumentation systems wherein angular attitude command information is supplied in binary digital form and gyroscopic attitude reference information is supplied in analog form. Many other similar applications will be evident to those skilled in the art of servomechanisms.

While the invention has been described in its preferred embodiments, it is to be understood that the words which have been used are words of description rather than limitation and that changes within the purview of the appended claims may be made without departing from the true scope and spirit of the invention in its broader aspects.

We claim:

1. Apparatus for producing an analog output signal proportional to the angular difference between an analog electrical angle input signal and a digital electrical angle input signal comprising:

means for receiving the digital input signal and first and second trigonometric functions of the analog input signal, digital-to-analog converter means for producing in response to the digital signal a first pair of trigonometric functions corresponding to a first value of the digital signal and a second pair of trigonometric functions corresponding to a second value of the digital signal, said first and second values being separated by a predetermined amount whereby they may bracket the analog signal, multiplier means for providing a first product signal of the first function of the analog signal and one function of the first pair of trigonometric functions, a second product signal of the second function of the analog signal and the other function of the first pair of trigonometric functions, a third product signal of the first function of the analog signal and one function of the second pair of trigonometric functions, and a fourth product signal of the second function of the analog signal and the other function of the second pair of trigonometric functions, and means for combining the first and second product signals to provide a first difference signal which is a function of the difference between the analog signal and the first value of the digital signal and combining the second and third product signals to provide a second difference signal which is a function of the difference between the analog signal and the second value of the digital signal.

2. The apparatus of claim 1 wherein: the first product signal is the sine of the analog signal multiplied by the cosine of the first value of the digital signal, the second product signal is the cosine of the analog signal multiplied by the sine of the first value of the digital signal, the third product signal is the sine of the analog signal multiplied by the cosine of the second value of the digital signal and the fourth product signal is the cosine of the analog signal multiplied by the sine of the second value of the digital signal.

3. The apparatus of claim 2 wherein the digital-to-analog converter means and the multiplier means comprise a plurality of transformers each having a plurality of taps operating in conjunction with tap select logic and switching circuits responsive to the more significant bits of the digital signal for grounding appropriate taps on each transformer to provide the product signals.

4. The apparatus of claim 3 wherein the converter and multiplier transformers total four in number, the sine function of the analog input signal being applied across the primary winding of two of the transformers with the cosine function of the analog input signal applied across the primary winding of the other two transformers, and the taps positioned so as to generate sine and cosine voltage transformation ratios between the primary and secondary windings.

5. The apparatus of claim 4 wherein the transformation ratio-controlling taps are connected to the primary windings and are operative to produce a 90° sector of the sine and cosine functions of the digital signal, and the end terminals of the secondary windings of each transformer connect to tap select and logic circuits responsive to the two most significant bits of the digital signal for selectively grounding one of the end terminals to provide quadrant switching such that each transformer is operative through 360°.

6. The apparatus of claim 5 wherein the combining means comprises two additional transformers having the first and second product signals connected across the primary winding of one of said additional transformers and the third and fourth product signals connected across the primary winding of the other of said additional transformers.

7. The apparatus of claim 1 and further including means for subtractively combining the first and second difference signals to produce a reference signal having an amplitude which tracks the magnitude of the analog signal.

8. The apparatus of claim 7 wherein the converter means is responsive to the more significant bits of the digital signal and further including:

additional digital-to-analog converter means connected to receive the reference signal and responsive to the less significant bits of the digital signal for selecting a fractional part of said reference signal; and means for algebraically summing the first difference signal and the selected fraction of the reference signal to provide the output signal which is a function of the angular difference between the analog and digital input signals.

9. The apparatus of claim 8 and further including means for providing the analog and digital input signals, the analog signal providing means comprising an earth's magnetic field sensitive mechanism responsive to the horizontal component of the earth's magnetic field for determining directivity with respect thereto.

10. The apparatus of claim 9 and further including means connected to the earth's field sensitive mechanism for converting three-wire data, the three-wire data being represented by three signals of equal frequency having cyclically varying amplitudes phase shifted by 120° relative to one another and the two-wire data being represented by two signals which are also functions of said equal frequency and have cyclically varying amplitudes phase shifted by 90° relative to one another.

11. The apparatus of claim 8 and further including:

a phase detector connected to the algebraic summing means to receive the output signal and generate therefrom a control signal whose polarity depends on the relative angular values of the analog and digital input signals; and a digital processor connected to the phase detector to receive the control signal and provide the digital input signal.

12. The apparatus of claim 11 wherein the digital processor includes an up/down counter whose direction of count is determined by the polarity of the control signal to vary the digital input signal such that it corresponds to the analog input signal whereupon the output signal reduces to zero.

13. The apparatus of claim 12 and further including a flux valve for determining directivity with respect to the horizontal component of the earth's magnetic field, and a Scott T transformation device for converting the three-wire flux valve data to equivalent two-wire data represented by sine and cosine functions of the angle between the flux valve axis and the horizontal component of the earth's magnetic field.